United States Patent [19]

Wagner

[11] 4,390,192
[45] Jun. 28, 1983

[54] TRAILER GOOSENECK APPARATUS

[76] Inventor: Wilbert A. Wagner, U.S. Highway 20, Garden Prairie, Ill. 61038

[21] Appl. No.: 217,050

[22] Filed: Dec. 16, 1980

[51] Int. Cl.³ .............................................. B62D 53/06
[52] U.S. Cl. .................................................. 280/425 A
[58] Field of Search ...................... 280/423 B, 425 A

[56] References Cited

U.S. PATENT DOCUMENTS 3,215,449 11/1965 Tolbert ........................... 280/425 A
3,517,945 6/1970 Fikse ............................... 280/425 A
3,536,340 10/1970 Tolbert ........................... 280/425 A

FOREIGN PATENT DOCUMENTS 1051938 4/1979 Canada ........................... 280/425 A
1583861 2/1981 United Kingdom ............ 280/423 B Primary Examiner—Joseph F. Peters, Jr.
Assistant Examiner—Ross Weaver
Attorney, Agent, or Firm—Andrus, Sceales, Starke & Sawall

[57] ABSTRACT

A gooseneck apparatus for connecting a lowboy trailer to a truck-tractor includes a horizontal section having a king pin connection and a vertical section. The horizontal section includes side rails. A hydraulically actuated lift mechanism is provided within the horizontal section for positioning the gooseneck apparatus with respect to the tractor bed. The vertical section includes a pair of open-top side box-like sections aligned beneath each side rail, and a pivot support connects the upper forward portion of each to the side rail. The pivot support axis is in the horizontal plane inclusive of the ling pin. Trailer lift cylinders are pivotally connected to the vertical section and side rails and are essentially vertically oriented in the transport position. The lift pivot connections are located with respect to the forward main pivot support to provide the necessary arcuate movement of the vertical sections. A forward slotted plate depends below a bottom support wall of each vertical section. The trailer includes a coupling pin aligned with the plate opening. A horizontal coupling includes a pneumatic operated vertical coupling pin interconnected to pin opening in trailer. The vertical sections include pivotally mounted vertical load walls aligned with the side rails and pivoted outwardly to a release position with the side rail dropping into the vertical section and permit collapse of the gooseneck apparatus and the trailer bed to allow separation of the trailer and gooseneck apparatus. The pivot connections between the horizontal and vertical sections and particularly the forward pivot connection with respect to the truck tractor connection are located with respect to each other to provide proper motion and movement in the coupling and decoupling of the trailer bed without requiring and creating relative movement of the tractor and trailer.

15 Claims, 6 Drawing Figures

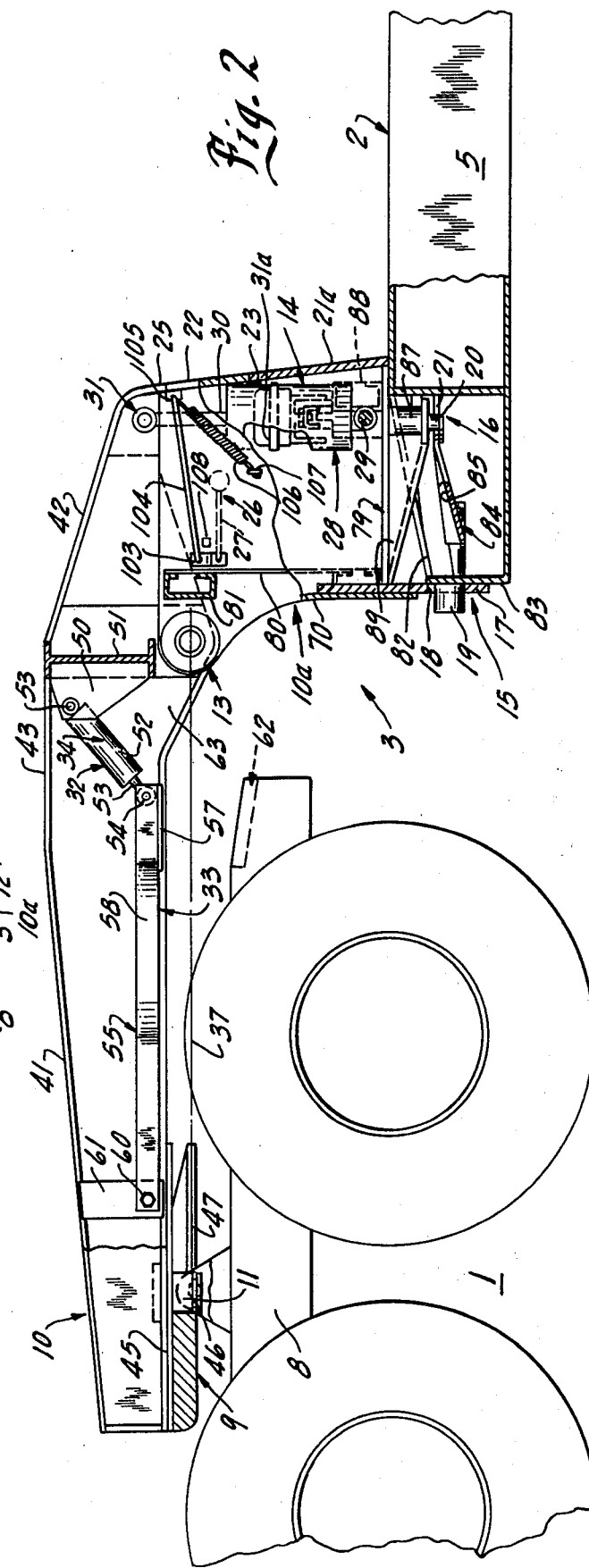

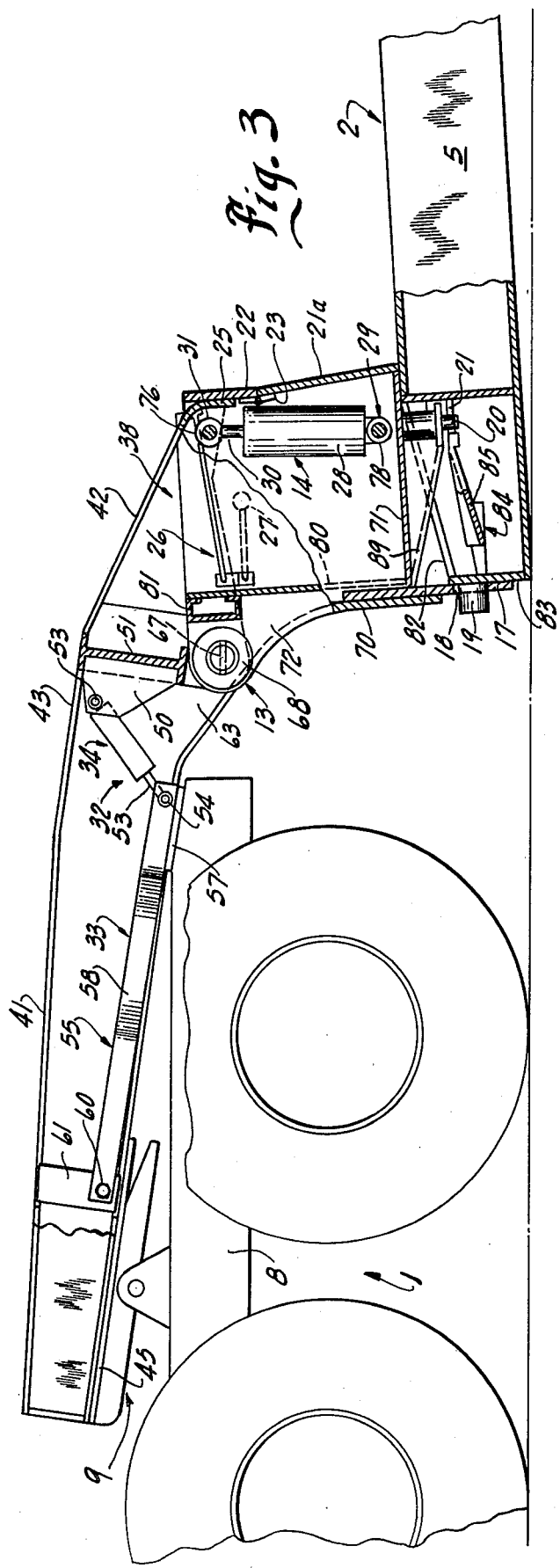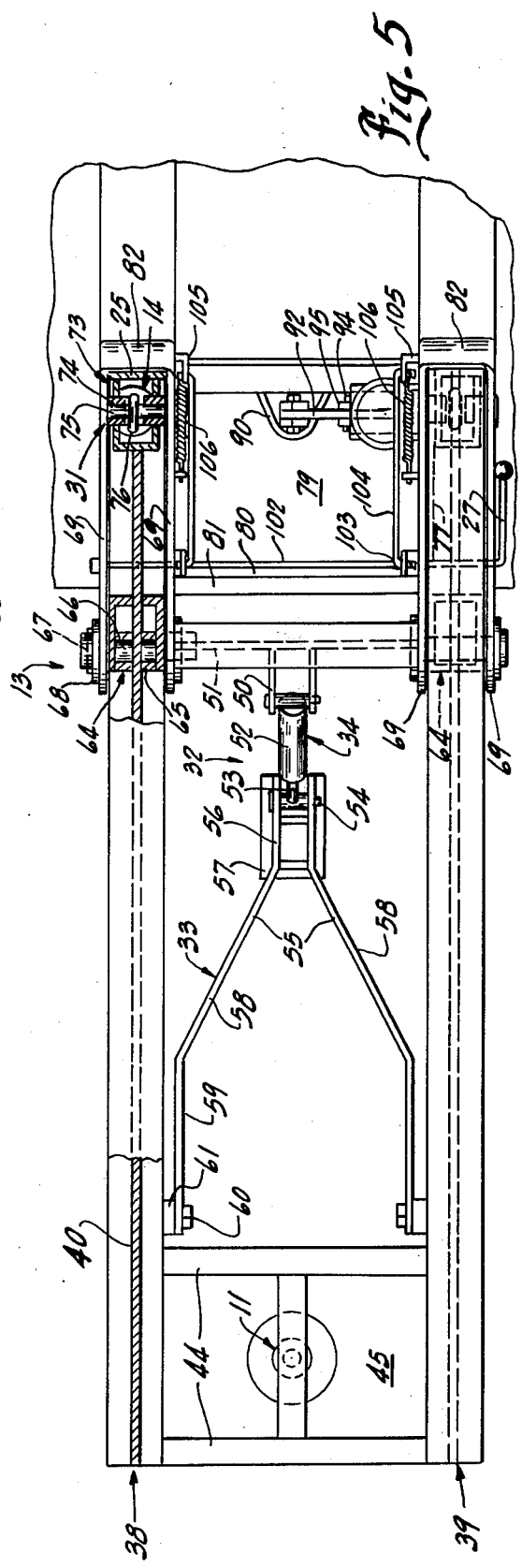

TRAILER GOOSENECK APPARATUS

BACKGROUND OF THE PRESENT INVENTION

This invention relates to a truck trailer goose neck apparatus and particularly for interconnecting of a low-boy trailer to a truck tractor.

Commercial trucking includes semitrailer systems wherein a truck tractor is releasably coupled to a trailing load carrying trailer for over the road transport of loads. A low-boy trailer is widely used for transport of off-road construction equipment, such as graders, shovels and the like. The low-boy trailer consists of a supporting flat bed structure of a convenient length and width for carrying one or more off-road vehicles. The flat bed is supported at the trailing end by one or more sets of tired wheel supports. The bed structure extends forwardly from the wheel supports and is pivotally supported thereon. The gooseneck apparatus is connected to and supports the free end of the flat bed for over the road movement. Thus, the gooseneck apparatus generally includes a vertical section connected to the forward end of the trailer and a horizontal section which extends forwardly from the vertical section with a releasable pin coupling to the fifth wheel as a cooperating coupling element on the truck tractor. The off-road equipment may be conveniently loaded and unloaded from the trailer bed structure at the forward free end. The gooseneck structure is therefore releasably coupled to the forwarding end of the trailer or the structure may be constructed to form a collapsable ramp structure for loading and unloading of the off-road vehicles. The gooseneck structure is also normally built with hydraulically actuated members within the gooseneck structure for relative movement relative to the bed structure for separation from the trailer bed with the gooseneck in place on the truck tractors. The operator will drive to the loading or the unloading site, sets the brakes on both the truck tractor and the trailer to establish a firm stopping of each unit. The hydraulic system is actuated for repositioning and release of the gooseneck structure from the trailer bed. For example, a collapsable gooseneck structure is shown for creating a loading and unloading ramp is shown in U.S. Pat. No. 3,419,119. Generally the conventional system employs complete disconnection of the gooseneck structure from the trailer bed which permits the lowering of the bed structure to the ground for convenient movement of the off-road vehicles onto and/or from the bed structure. Various systems have been suggested in the patented art and certain systems used for releasable connection of the trailer. For example, detachable gooseneck structures for releasably coupling to the trailer bed are shown in U.S. Pat. Nos. 2,545,584; 2,777,713; 2,822,945; 2,944,834; 2,953,396; 2,967,720; 2,978,128; 3,027,030; 3,215,449; 3,384,390; 3,416,683; 3,419,169; 3,450,417 and 3,498,636. The prior art generally includes various hydraulic systems for repositioning of the gooseneck structure relative to the trailer bed with an interrelated repositioning of the trailer bed during the connection and disconnection.

The truck-trailer units are heavy and massive structures, and the truck tractor and the trailer is provided with an individual braking unit. The braking units are operable during over road movement for stopping or slowing of the movement of the assembly. The individual brakes are also used to or set to hold the separate units immovable when stopped and the trailer is to be separated. This becomes particularly significant of course if the units are parked upon an inclined surface or ground. In the separation of the truck tractor from the trailer, it is therefore desirable and often necessary to have the brake units set. However, with the conventional gooseneck connections some relative movement between the trailer and truck tractor is often created tending to move the trailer relative to the truck tractor. If the truck and the trailer brakes are set, relatively skidding movement between the truck tractor and the trailer must occur, placing relatively heavy loads on the assembly. Such skidding makes separation difficult if the assembly is on any significant grade or the ground is soft. Off-road vehicles may require unloading at a building site where the ground is reasonably soft and a hard supporting surface is not conveniently available. Thus, creating the necessary relative movement between the trailer and truck tractor may require exceedingly high forces and may even create excessive if not damaging loading on the separating apparatus. Although hydraulic power systems may be constructed of a sufficient strength and force to affect separation where required, the complexity and cost is relatively substantial.

SUMMARY OF THE PRESENT INVENTION

The present invention is particularly directed to an improved gooseneck apparatus including an inverted L-shaped gooseneck apparatus having a horizontal section including a releasable pivot connection assembly to a truck tractor and a vertical section including a unique releasable entrance support and connection assembly to the trailer bed and between the horizontal and vertical sections which permit the conveneint attachment and detachment from the trailer bed without requiring relative movement between the truck tractor and the trailer bed. The present invention thus provides a gooseneck apparatus which can be applied to a low-boy trailer unit for reliable and safe attachment and detachment of the truck tractor and gooseneck assembly from the trailer bed. Generally in accordance with the teaching of the present invention, the vertical section is pivotally interconnected at its forward or tractor end to the understructure of the horizontal section and extends rearwardly beneath the horizontal section. The trailing ends of the horizontal section rests upon the vertical section and the sections are interconnected by a powered actuating means such as hydraulic cylinder units pivotally interconnected to two sections. The lower end of the vertical section is coupled to the low-boy trailer by a combination of horizontal and vertical pin-like connections. The horizontal pin-like connection provides a vertical support with releasable interconnection of the trailer to the vertical section which includes a separate pivotally mounted load structure in the vertical section which is movable to permit the attachment and detachment of the trailer without requiring relative motion between the truck tractor and the trailer bed. The vertical pin-like coupling means allows corresponding interconnection of the trailer to the vertical section without relative movement between the trailer bed and the tractor. The inventor has found that a significant and critical factor is the proper positioning of the pivot connections between the horizontal and vertical sections and particularly the forward pivot connection with respect to the truck tractor connection. Thus, the center or the pivot axis locations must be rather accurately located with respect to each other in order to provide proper motion and movement in the coupling and decoupling of the trailer bed for optimum operation and, particularly without requiring and creating relative movement of the tractor and trailer.

More particularly in accordance with the preferred embodiment of the present invention, the gooseneck apparatus includes a horizontal section including a pair of interconnected horizontal side rails, the forward ends of which are interconnected to each other and include a central depending coupling pin adapted for interlocking connection to the conventional fifth wheel of truck tractor. A hydraulically actuated lift mechanism is provided within the horizontal section for supporting on or positioning the gooseneck apparatus with respect to the tractor bed. The vertical section of the gooseneck apparatus includes a pair of side box-like sections aligned with and mounted immediately beneath the trailing end of the horizontal side rails.

The vertical box-like sections are interconnected to each other by a suitable strengthening plate structure and a main horizontal pivot support structure pivotally interconnecting the upper forward portion of each to the under side of the corresponding horizontal side rails. The axis of the pivot support structure is accurately located in a horizontal plane inclusive of the connection of the horizontal section to the truck tractor coupler. This relative location of the pivot connections has been found to be a significant relationship in the desired operation and functioning of a gooseneck structure. The trailer lift cylinder units extend substantially throughout the length of the vertical sections and are essentially vertically oriented in the transport position. The pivot connections of the lift cylinder units are located with respect to the forward main pivot support to provide the necessary arcuate movement of the lower end of the vertical sections.

The lower end of each vertical section includes a forward coupling plate which depends below a bottom support wall. The coupling plate and the forward end of the trailer include a pin and slot coupling assembly. In the preferred embodiment, the depending coupling plate includes an opening specially formed to accommodate a coupling pin secured to the forward end of the lowbed trailer. The trailing ends of the vertical section includes pivotally mounted vertical locking support members which include a support position locking the bottom wall of the vertical section in place and a release position in which the bottom wall is movably about the main pivot support. During the coupling and decoupling of the gooseneck apparatus, the lift are extended to releasing the locking suppport. The horizontal section is pivoted relative to the truck to support the gooseneck apparatus on the tractor bed and to lower the vertical section and the trailer to the release position of the vertical section. The vertical section is thus collapsed with the trailer bed pivoting about the wheel support and in such a manner as to allow the tractor and gooseneck apparatus to separate. In order to interlock the trailer to the truck tractor for over the road movement a separate horizontal coupling is provided. Simple and reliable coupling includes a pneumatic operated coupling pin interconnected to pin opening connection. In a preferred embodiment, a coupling pin is supported on the center line of the gooseneck between the vertical sections. A pneumatic bellow unit is mounted in fixed relation and connected by a lever arm to the pin. The trailer includes a coupling opening which is aligned with the coupling pin when in a raised horizontally coupled position. The pneumatic unit may then be actuated to insert or withdraw the pin from the vertical opening. The accurate location of the several pivot connections between the trailer, the horizontal section and the vertical section of the gooseneck apparatus with respect to each other permits the relative motion and positioning.

The horizontal section in the preferred embodiment is preferably constructed with an upper wall which is generally an inverted slightly concave shape having a relatively long forward inclined portion interconnected to a generally horizontal central portion and a trailing downwardly inclined portion. In the loaded position, the trailing end of the horizontal section is located for convenient overlying loading of off-road vehicles having the forward wheel portion overlying the gooseneck apparatus.

The present invention thus establishes a reliable means for coupling and decoupling of a lowbed trailer relative to the truck tractor regardless of the location and environment in which the coupling and decoupling is effected. The inventor has found that this structure produces an extremely reliable and yet relatively low cost coupling particularly adapted to the connection and deconnection in the lowboy trailer, particularly in an otherwise difficult or dangerous environment.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a side elevational view of a truck tractor and lowboy trailer assembly in the coupled over the road position;

FIG. 2 is an enlarged side elevational view of the gooseneck apparatus shown in FIG. 1 with fragmentary portions of the truck tractor and the lowboy trailer shown for illustrating the structural connection therebetween;

FIG. 3 is a view showing the gooseneck structure in the position for disconnection of the truck tractor from the lowboy trailer;

FIG. 5 is an end view from the back side of the gooseneck apparatus; and

DESCRIPTION OF THE ILLUSTRATED EMBODIMENT

Figure 4:
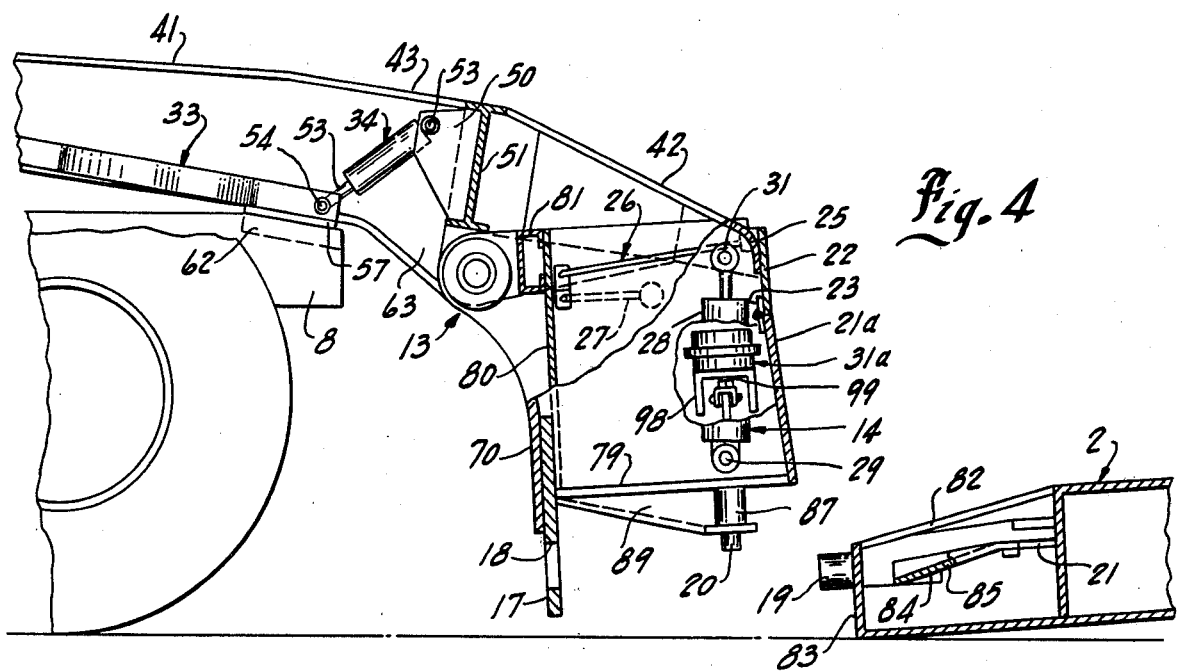
FIG. 4 is a view similar to FIG. 3 showing the disconnected position.

Referring to the drawings, a conventional truck tractor 1 is connected to a lowbed trailer 2 by a gooseneck apparatus 3 which is particularly constructed in accordance with the teaching of the present invention. An off-road vehicle 4, such as a road grader 4 is carried by the trailer 2 for over-the-road transport.

The trailer 2 is a conventional structure having an elongated flat bed 5 supported at the trailing end by a plurality of wheels 6. The flat bed pivots about the wheels 6 with the forward end thereof interconnected to and supported by the gooseneck apparatus 3. The truck tractor 1 is similarly a conventional unit having the rear wheels 8 with a fifth wheel 9 for releasable connection to the gooseneck apparatus 3 and thereby to trailer 2. The gooseneck apparatus 3 generally includes a horizontal section 10 having a forward coupling or king pin 11 releasably connected to the wheel 9 and a trailing vertical support assembly 10a. Vertical assembly 10a includes laterally spaced and interconnected vertical sections 12 located beneath the trailing end to each side of the horizontal section 10. The vertical sections 12 are pivotally interconnected at the top forward end to the underside of the horizontal section 10 by a main pivot support unit 13. The trailing end of each vertical section 12 is similarly interconnected to the horizontal section 10 by a separate hydraulic power cylinder unit 14 for positioning of the corresponding vertical section 12. The power cylinder units 14 are actuated for positioning a vertical trailer coupling assembly 15 and a horizontal coupling assembly 16 between coupling and release positions. The trailing assembly 15 supports the low bed trailer 2 with bed 5 pivoted upwardly off the road or ground and in the transport position. Generally, in the illustrated embodiment of the invention, each coupling assembly 15 includes an apertured plate 17 secured to a forward wall 18 of the vertical section 12. The aperture plate 17 includes a coupling opening 18 adapted to move onto a horizontal coupling pin 19 secured to the forward end or wall of the trailer bed 5. In the transport position, the forward end of the trailer bed 5 is held upwardly off the group and supported conjointly with the trailing wheels 6 in a generally horizontal transport position. The horizontal coupling assembly 16 includes a coupling pin 20 on the vertical section 12 which is movable into and from a coupling opening 21 in a central forward portion of the trailer bed 5. Pin 20 couples the tractor 1 to the trailer 2 for over the road movement. The trailer lift cylinder unit 14 positons the vertical section 12 relative to the horizontal section 10 and the trailer bed 5 such that the coupling assembies 15 and 16 may be engaged and disengaged without relative movement between the tractor 1 and trailer 2.

Each vertical support section 12 is similarly constructed with back or rear wall 21a having an upper load plate 22 pivotally connected by a pivot support 23 to the lower portion of the rear wall. In the support position of FIG. 2, the load plate 22 is located in the plane of the back wall 21 with the trailing end wall 25 of the horizontal section 10 resting thereon. In the position for attaching or detaching the gooseneck apparatus 3 at assemblies 15 and 16, the load plate 22 is pivoted outwardly of the back wall 25 of the horizontal section to permit collapse of the horizontal section 10 into the vertical support section 12, as shown in FIGS. 3 and 4.

A mechanical positioning mechanism 26 includes a manually operated handle 27 for positioning of the load plate 22 in the support position and in the release position.

The trailer lift cylinder units 14 is operable to pivot the sections 10 and 12 relative each other about pivot connection 13 to relieve the load from plate 22 and permit the release thereof, as well as to support the vertical section 12 upon section 10.

The trailer lift cylinder unit 14 includes a cylinder 28 pivotally connected at the bottom trailing portion of the vertical section 12 by pivot connection 29. The piston rod 30 extends outwardly from the cylinder 28 into the trailing end of the horizontal section 10 and is pivotally connected to the horizontal section by a pivot connection 31. The pivot connections 29 and 31 are essentially in vertical alignment. The expanded position of the power cylinders pivots the horizontal section 10 to permit pivoting of load plate 22 to and from the vertical support position. The collapse or retraction of the cylinder units 14 with the load plate 22 released causes relative pivotal movement of the vertical box sections 12 and the horizontal section 10 with the horizontal section pivoting about the fifth wheel 9 to lower the gooseneck apparatus 3 and the trailer bed 2 to the ground position with the releasable coupling units 15 and 16 between the forward end of the trailer bed 5 and the gooseneck apparatus 3 positioned for release.

Thus, during the pivotal movement, the pin 19 moves upwardly within opening 18 and the pin 20 moves rearwardly into the rearward portion of the extended trailer opening 21. The pin 20 is coupled to a positioning means such as a pneumatic operation unit 31a which is operable to raise pin 20 upwardly to a release position at which time the tractor may be driven forwardly with the coupling plate 18 moving off from the coupling pin 19, as shown in FIG. 4.

A gooseneck lift mechanism 32 is provided within horizontal section 10 having a support arm 33 which is adapted to rest on the tractor bed 8. A power cylinder unit 34 positions the arm 33 and is operable to raise the gooseneck apparatus 3 and the trailer bed 2 from the ground engaging positioning of FIG. 3 to the trailering portion of FIG. 2. For attachment, truck tractor 1 is positioned with the coupling assemblies 15 and 16 in the coupling positions of FIG. 3. The brake units, not shown, on both the truck tractor and the trailer are set to lock them in relatively fixed relationship. The gooseneck and trailer lift cylinder units 34 and 14 are actuated to expand thereby causing the horizontal section 10 to pivot upwardly about the fifth wheel connection and the vertical sections 12 to pivot in a counterclockwise direction to the vertical aligned position. In moving into such positions, the coupling assemblies 15 and 16 move into the trailering positions. Simultaneously, the plate 17 pivots upwardly to engage and raise the coupling pin 19 with a corresponding pivoting of the trailer bed 5 on the wheels 6. This also results in the vertical section 12 of the gooseneck apparatus 3 moving into the vertical transport position, with the trailing wall 25 of the horizontal section 10 overlying the rear wall 21a, and with coupling pin 20 moving forwardly into opening 21. The mechanism 26 is actuated to align the load plate 22 with wall 25. The trailer lift cylinder units 14 are then retracted and the wall 25 moves into supporting engagement with the load plate.

This complete pivotal movement occurs by appropriate location of the pivot connections 13, 29 and 31 with respect to each other and with respect to the truck tractor fifth wheel connection pin 11 without any relative horizontal motion between the truck tractor 1 and the trailer 2. Thus the pivot connection 13 is in a substantially horizontal plane 37 with the king pin 11. Pivot connections 29 and 31 are essentially in a vertical plane end to the opposite sides of the pivot connection 13. In pivoting from the trailering position to the release position, the pivot connection 13 pivots about the king pin 11. The trailer lift cylinder 14 is collapsed and the vertical section 12 is opened to receive the horizontal section 10 and allows the lower end of the vertical section 12 and trailer bed 5 to drop, with the vertical section pivoting about pivot connection 13 to follow the inclination of the trailer bed 5. The pivot connector 29 and 31 moves into vertical alignment, as shown in FIG. 3. Pin 19 moves upwardly within hole 18 and pin 20 moves rearwardly within opening 21 to accommodate the pivotal movement of the trailer bed 5 and to take the load off of the trailering coupling pin connections 18-20.

As the result during the trailer attachment and detachment, there is no essential relative movement between the truck tractor 1 and the trailer 2 permitting safe operation with the unit on a significant grade, relatively soft ground or the like.

More particularly, as illustrated in FIGS. 2 and 3, the horizontal section 10 includes laterally spaced side rails 38 and 39, each of which is similarly constructed with a supporting I channel 40 extending the length of the horizontal section 10. The side rails are laterally spaced in accordance with conventional construction somewhat less than the width of the trailer 2 and truck bed 8.

The top plate of the side rails 38-39 are similarly configured to define a downwardly inclined rearwardly and forwardly portions 41 and 42 interconnected by a generally horizontal connection portion 43. This provides a rigid support structure with the appropriate clearances with respect to the load structures 4 for optimum loading of certain off-road graters and the like, such as shown in FIG. 1. The king pin 11 is secured to the forward portion centrally between the side rails 38 and 39. Spaced and laterally extended and cross support rails 44 are secured to the side rails as by a weld or the like and to a heavy metal support plate 45 and the pin 11 is affixed to the plate. The king pin 11 is a conventional type coupler provided with an annular groove 46 which is adapted to move into a coupling slot 47 in the trailing end of the conventional fifth wheel 9. The pin 11 is releasably latched in place with any well known latch means. The vertical load is thus transmitted from the plate 45 to the fifth wheel 9 for supporting of the gooseneck apparatus 3 and the trailing load 3. The pin 11 of course also transmits the forward and reverse motion of the truck tractor 1 to the gooseneck apparatus 3 and thus to the trailer unit 2 for corresponding forward and reverse movement of the trailer unit with the truck tractor.

The hydraulically actuated gooseneck lifting mechanism 32 includes the relatively small hydraulic power cylinder unit 34 centrally located between the side rails adjacent to the horizontal portion of the gooseneck apparatus. The cylinder unit 34 is pivotally connected to a pivot arm bracket 50 secured to a cross beam 51 of the section 10. The power cylinder unit 34 includes a cylinder 52 pivotally interconnected by pivot bushing and pin 53 to horizontal section bracket 50. The cylinder 52 extends downwardly and forwardly with a piston rod 53 extended outwardly. The lower outer end of the rod 53 is interconnected to the pivot arm 33 and particularly the trailing end thereof by a bushing and pivot pin unit 54. Referring to FIGS. 2 and 5, the pivot arm 33 includes a pair of similar side arms 55. Referring to side arm 55 it includes a short, straight portion 56 secured directly to the one side of the piston rod bushing and pivot pin 54 and extended forwardly therefrom for the length of a support plate 57. An intermediate portion 58 extends laterally and forwardly to the side rail 39. A forward extension portion 59 extends along the side rail 39 to a forward pivot connection 60, which is made to a vertical plate 61 welded or otherwise secured to the I beam 40. The pivot arm 33 is located in the transport portion within the side rails 38-39, with the plate 57 generally just within the lower plane of the side rails, as shown in FIG. 2, and above the trailing end of the truck tractor bed 8, which includes a cross beam 62 in alignment with the plate 57.

In the connection and disconnection, the horizontal section 10 pivots relative to the vertical assembly 10a about the main pivot connection 13, with the vertical sections 12 correspondingly pivoting relative to the pivot connections 29 and 31 of the hydraulic cylinder units 14.

The vertical sections 12 are generally identical open-top box-like sections which are pivotally interconnected to the corresponding side rail sections 38-39, which in turn are constructed to move into the opened top portion of the aligned box-like vertical sections, as shown in FIGS. 3 and 4 and more fully described hereinafter.

Referring particularly to side rail 38, the trailing portion thereof and particularly the rearward downwardly inclined trailing portion 42 includes a lower protruding portion 63 accommodating and forming the interconnecting support portion of the pivot connection 13, generally in the area of the cross beam 51.

Referring particularly to FIGS. 3 and 5, each pivot connection 13 for each vertical section 12 is again similarly constructed. Referring to the pivot connection to side rail 38, a box-like support member 64 is formed within the side rail 38 by a pair of oppositely aligned channels which are welded or otherwise rigidly secured as by welding to the opposite side of the central plate of the side rail I beam 40. The box-like support member and the I-beam are provided with aligned openings within which a pivot bushing 65 is secured as by welding or the like. A pivot shift 66 is journaled in such bushing 65 and projects outwardly to the opposite ends thereof. The outer end of the shaft 66 may be provided with an axially extended grease opening, not shown, which discharges into the bearing surface between the bushing 65 and the shaft 66. The outer ends of shaft 66 are pinned as by a pin 67 to connect caps 68 of the vertical section 12.

Each vertical section 12 of the gooseneck apparatus 3 is located in supporting relationship beneath the trailing portions of the side rails 38 and 39 respectively. Each of the vertical section is similarly constructed as a box-like support and the one section as clearly shown in FIGS. 2-6 is described. In particular, the vertical section 12 includes the pair of side walls 69 interconnected to each other by a forward wall 70, the back wall 21a, and a bottom wall 71. the opposite side walls 68 and 69 are generally flat plate-like members having the upper forward pivot portions 72 extending forwardly and interconnected by correspondingly shaped forward wall 70.

In the illustrated embodiment of the invention, the bearing member 68 includes a ring-like flange which is welded or otherwise affixed to pivot portion 72 of side wall 69 to strengthen the pivot support. The opposite sides of the pivot assembly 13 are thus similarly constructed at the inside wall of the vertical section. The pivot assembly thus provides for a pivotal support of the vertical section 12 upon the horizontal section 10.

As previously noted, the side rail 38 projects rearwardly to the trailing most end and is constructed to collapse into the aligned vertical section 12 to allow the previously described interaction between the back wall 21a of the side rail and the load plate 22 of the vertical section 12. The trailing portion of the side rail 38 is provided with an internal box-like support member 73 to strengthen the pivot connection 31 to the cylinder piston rod 30. As shown in FIG. 5, the trailing most portion of the side rail 38 includes a box-like member 73 formed of suitable opposite channel-shaped members welded within its trailing most end. A pivot bushing 74 is secured within each of the outer walls of the box section 73 on pivot pin or shaft 75 of pivot connection 31. The bushings 74 are pinned to the shaft 75 to provide a shaft mounting. The cylinder rod 30 includes an upper bearing 76 journaled on the shaft 75 between the bushings 74. The shaft 75 may again be provided with an axial grease opening, not shown, to permit greasing of the internal bearing support. The box-like support members 64 and 73 may be interconnected by a plate 77 located on the inside of the side rail I-beam having the hydraulic connections and the like, as shown in FIG. 5.

The box-like vertical section 12 is thus pivotally secured to the side rail 38 at the pivot connection 13 and at the pivot connection 31.

The lower pivot connection 29 of the cylinder 28 of unit 14 includes a bearing 78 coupled to a pivot support assembly in the lower portion of the side walls 69 similar to the assembly for pivot connection 31. The box-like vertical section 12 are interconnected to each other by an L-shaped plate having a bottom plate 79 spanning the spacing thereof and an integral vertical wall 80 located inwardly of the section front walls 70. C-shaped channel members 81 are interconnected to the forward face of the vertical wall 80 and to the inner side wall 69 to provide a rigid interconnecting pivotally mounted rear section 12 for corresponding positioning thereof.

Figure 6:
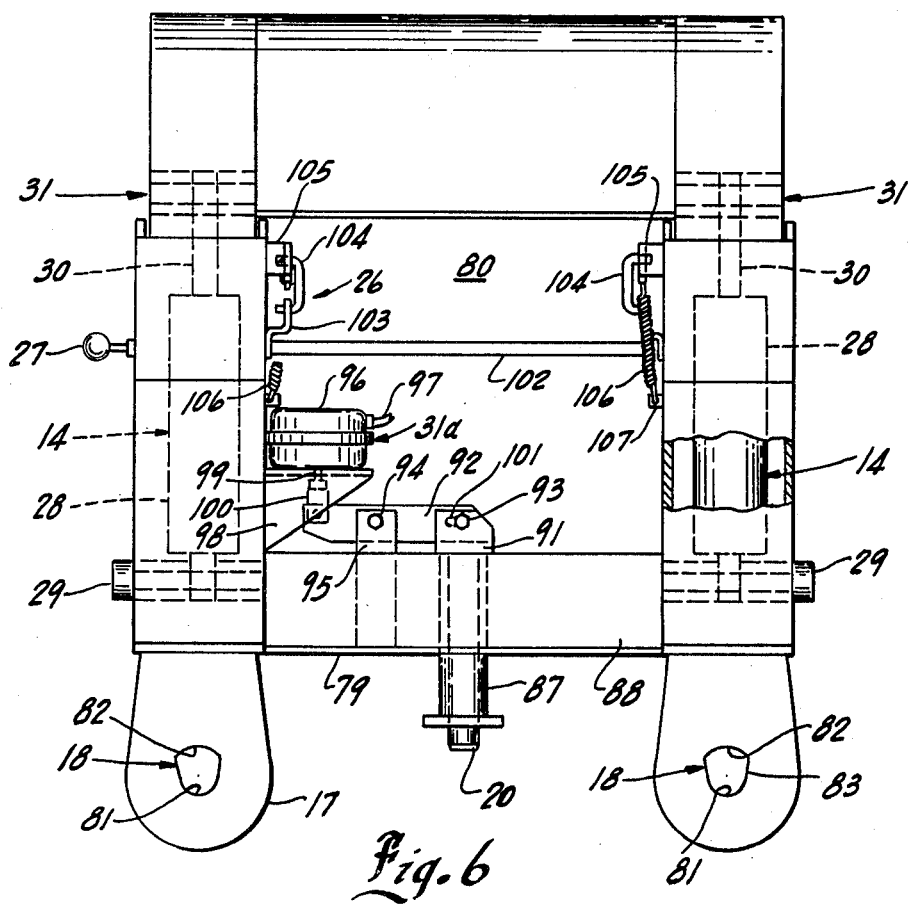
FIG. 6 is a top plan view of a gooseneck structure shown in FIGS. 1 and 2.

The coupling or hitch plate 17, most clearly in FIGS. 4 and 6, is shown as a separate member of a width generally corresponding to the width of the vertical section. The plate 17 extends upwardly behind the vertical portion of the front wall 70 and is welded or otherwise firmly affixed thereto. The lower portion of the plate 17 is generally provided with a circular bottom configuration and projects a laterally slightly of the box section 12. The coupling opening 18 is located within an enlarged circular upper portion.

In the preferred embodiment of the invention, the coupling opening 18 is specially formed having a bottom constant radius portion 81 generally corresponding to the diameter of the coupling pin 19 and an enlarged top radius 82. The spaced radii are connected by straight side wall portions 83. The enlarged vertical portion 82 provides for convenient coupling movement over pin 19 and vertical movement of the pin within the opening during the detachment and attachment of the trailer 2.

The forward end of the trailer 2 includes coupling rail projections aligned with vertical sections 12 and having a top wall conventionally formed as an inclined planar plate structure 82 having a length less than the depth of the overlying vertical section 12 and with a vertical front wall 83 containing the pin 19. In the assemblied position, plate 17 abutts wall 83 and the outermost portion of the section bottom wall 71 rests on the trailer bed 5 beyond wall 83. The coupling projections of the trailer 2 are interconnected by a connecting plate structure 84 which includes the coupling opening 21. The plate structure 84, as illustrated, includes an inclined entrance portion 85 and a final horizontal portion 86 within which the opening 21 is located. The opening 21 is an elongated slot having a width corresponding to the backing pin 20 and a depth slightly greater. The plate is welded or otherwise secured to the forward coupling projections to establish a rigid coupling structure to the trailer 2.

The gooseneck apparatus 3 includes the coupling pin 20 mounted between the vertical sections 12 and thus in alignment with the plate 21. The locking pin 20 is slidably supported in a tubular bushing 87 which extends upwardly through the bottom plate 79 which is secured between sections 12, immediately inwardly of forward cross beam 88. A supporting beam 89 is secured to the lower end of bushing 87 and to the underside of plate 79. A generally U-shaped bracket 90 encircles the upper end of bushing 87 with the forward edges welded or otherwise secured to the cross channel member 88 of the vertical section 12 to establish a rigid strong support for the locking pin. A bifurcated connector 91 is welded or otherwise firmly affixed to the upper end of the locking pin 20. A plate-like arm 92 is pinned to the connector 91 as at 93 and in turn is pivotally supported intermediate its length in a pivot support 94 in bracket 95 secured to the connecting channel and bottom wall. The plate-like arm 92 extends transversely of the gooseneck apparatus 3 with the free end interconnected to operating means 31a, which is shown as a bellows or air chamber 96 for selective positioning of locking pin 20. The air chamber 96 of the means 31a is a closed chamber member having an air inlet 97 coupled to a remote controlled air supply. The air chamber 96 is supported on a bracket 98 secured to the inner side wall 69 of the one vertical section 12. A threaded operating rod 99 is secured to the bottom wall of the air chamber and depends downwardly in alignment with the outer end of the pivot bar 92. A bifurcated coupling 100 is threadedly connected to the threaded shaft and pinned to the outer end of the pivot bar 92 such that the expansion and contraction of the chamber correspondingly positions the pivot bar 92 and thereby oppositely locates the locking pin 20. The pivot pin connector 93 includes a slot 101 in the pivot bar 92 to allow straight line movement of the locking pin 20 and pivotal movement of the pivot bar 92.

Proper alignment of the gooseneck vertical section 12 with the trailer 2 places the locking pin 20 aligned with the locking plate structure 84 of the trailer unit 2 and particularly the inclined wall portion 85 leading to the locking opening 21. As the gooseneck apparatus 3 is moved over the coupling end of the trailer 2, the pin 20 engages the inclined plate 85 and is forced upwardly into the bushing 87. At the coupling position, the coupling plates 17 abutt the forward vertical wall 83 of the trailer 2 and pin 20 is located in alignment with the opening 21 and drops outwardly into coupling engagement. Thus, it is not necessary to raise the pin 20 from the locking position during the coupling or attachment motion between the trailer 2 and tractor 1 to the position of FIG. 3.

As noted, the mechanism 26 is actuated via handle 27 to position the load plate 22 between the load support and the release positions.

As most clearly shown in FIGS. 2 and 4–6, the illustrated locking plate release mechanism 26 particularly includes a common shaft 102 extended through the vertical sections 12 and connected at the one side to the operating arm 27. The mechanism 26 preferably includes similar over-center spring-loaded linkage assemblies between the shaft 102 and the load plates 22 of the two vertical sections 12 at the inside wall 69 of each of the vertical sections. The over-spring mechanism, as shown in FIGS. 2 and 6, includes an actuating lever 103 secured to the shaft 102. The lever 103 includes an offset plate member having a first portion fixedly connected as by welding to the shaft 102 and an inwardly offset plate-like portion. A connecting U-shaped link 104 has one end secured within a suitable opening within the outer end of the lever 103. A positioning tab 105 is welded or otherwise secured to the upper end of the load plate 22 and provided with an opening receiving the opposite inwardly bent end of the connecting link 104. A coil spring 106 is secured at the upper end to the load plate tab 105 and extends forwardly and downwardly therefrom. The lower spring end of the spring 106 is secured by a bracket 107 to the inner side wall of the vertical section. The lever 103 in the load position of the load plate 22 extends vertically upwardly, as shown in FIG. 2. When the shaft or rod 102 pivots in a clockwise direction, as viewed in FIG. 2, the lever 103 correspondingly pivots and pushes the link 102 outwardly toward the load plate 22, thereby forcing the load plate 22 to pivot about its pivot connection 23 and outwardly of the load wall 25 of the horizontal section 10. The load plate 22 moves outwardly with the initial movement also elongating the spring 106 to a maximum extension, with the final movement of the load plate 22 pivoting the spring 106 over a maximum extension position whereby the spring collapses and the plate pivots outwardly to provide an over-center latching of the load plate 22 in the release position. A stop bar 108 is shown located adjacent to the pivot lever 103 to stop the linkage immediately after it moves over the center and thereby limits the motion of the linkage assembly. The spring loaded mechanism 22 holds the load plate 26 in the release position even after release of the handle 27. The mechanism is reversed or reset by opposite pivoting of handle 27.

In the over-the-road travel position for highway travel and the like, the side rails 38 and 39 rest on the load plates 22. The pressure is released from the hydraulic cylinder units and the air chamber. The locking pin is extended and rests against the front surface of the locking pin hole in the trailer 2. The gooseneck lift cylinder is in a retracted position; thereby establishing clearance between the gooseneck apparatus and the tractor frame. The trailer pins 19 are supported are supported upon the bottom of the trailer pin slots. To disconnect the trailer 2 from the truck-tractor 1, the brake units may be set and the trailer lift cylinder units 14 are extended just to release the load plates 22. Handle 27 is pivoted to release the load plates 22. The cylinder units 14 are then retracted till the forward end of trailer 2 is touching the ground. The gooseneck lift cylinder unit 34 is extended till the crossbar engages the tractor frame. The trailer lift cylinders are further retracted at least till there is clearance between the trailer pins 19 and the bottom surface of the trailer pin slots 18. The locking pin 20 has then pivoted and moved back in the locking pin hole 21 to the free position of FIG. 4. Air is supplied to the air chamber, which retracts the locking pin and thereby fully release the gooseneck apparatus from the trailer. The trailer air lines and the electrical line are disconnected from the gooseneck apparatus, and the gooseneck apparatus can be removed by driving the tractor straight ahead to the position of FIG. 4. To reconnect the gooseneck apparatus 3 to the trailer 2, the air is removed from air chamber, thereby allowing the spring-loaded locking pin 20 to fully extend. Tractor 2 is backed toward the trailer and the gooseneck is thereby moved onto the trailer. The locking plate engages the pin and centers the gooseneck on the trailer. The inclined cam plate on the trailer retracts the locking pin to move over the locking plate and into the pin hole. The spring-loaded pin then extends itself to lock the gooseneck apparatus 3 to the trailer 2. The gooseneck lift cylinder unit can then be retracted, and the trailer lift cylinder units are extended to raise the trailer till the spring-loaded pins 21 and load plates 22 fall into position. The pressure on the cylinder units 14 is relieved until the side rails 38-39 of the gooseneck apparatus 3 are again resting on the load plates of the vertical sections. The air lines and electrical line are reconnected to the gooseneck apparatus, and the trailer 2 is again locked in the travel position of FIG. 2.

The present invention thus provides an improved trailer gooseneck apparatus which may be readily constructed as a rugged unit having a relatively long life while permitting convenient attachment and detachment to a trailer even in an adverse loading environment.

Various modes in carrying out the invention are contemplated as being within the scope of the following claims, particularly pointing out and distinctly claiming the subject matter which is regarded as the invention.

I claim:

1. A gooseneck apparatus adapted for releasably connecting a truck-tractor unit to a trailer unit having trailing wheel means, said truck-tractor unit and trailer unit adapted to be locked in place to oppose relative inline movement, comprising a horizontal section having a forward tractor pivot means for releasably connection to a tractor, a vertical section depending from the trailing end of said horizontal section, a pivot support means connecting said vertical section to said horizontal section, power means connected between said horizontal section and said vertical section for relatively positioning said vertical section about said pivot support means, a vertical trailer coupling means having a first member connected to the forward end of the trailer unit and a second member connected to the bottom end of said vertical section, a horizontal coupling means having a first member connected to said vertical section and a second member connected to said trailer unit and establishing a pivotal horizontal connection, and said horizontal and vertical sections being constructed and arranged with a releasable load transmitting means and said pivot support means and said power means movable from a load transport position to a release position establishing relative pivoting movement between the horizontal and vertical sections with an essentially constant operative spacing of the tractor pivot means and the coupling means whereby said truck-tractor unit and said trailer unit may be locked in position and said gooseneck apparatus released from the trailer unit without relative in-line movement therebetween.

2. The gooseneck apparatus of claim 1 wherein said pivot support means has the pivot axis located in a horizontal plane substantially through said tractor pivot connection.

3. The apparatus of claim 1 or 2 wherein said vertical trailer coupling means includes a slotted means and a projection means connected one to the forward end of the trailer means and one to the bottom end of said vertical section, said slotted means having a greater vertical length than said projection means, and said horizontal coupling means includes a slotted means and a pin connected one each to said trailer unit and to said vertical section.

4. The gooseneck apparatus of claim 3 wherein said vertical coupling means includes a depending plate means secured to the forward portion of the vertical section, said plate having a coupling opening, said projection means of said vertical coupling means including a horizontally projecting pin means whereby said vertical section overlies said trailer unit with said depending plate means abutting said trailer unit, and said horizontal coupling means being located centrally of said trailer unit and includes a vertically movable coupling pin secured to said vertical section, and an opening in the top of the trailer unit, said coupling being movable essentially perpendicular to the horizontal transport position of said gooseneck apparatus, said vertical opening having a longitudinal length slightly greater than the diameter of said pin and located to locate the pin in the forward most end in the trailering position.

5. A gooseneck apparatus adapted for releasably connecting a truck-tractor unit to a trailer unit having trailing wheel means, comprising a horizontal section having a forward tractor pivot means for releasably connection to a tractor, a vertical section depending from the trailing end of said horizontal section, a pivot support means connecting said vertical section to said horizontal section, power means connected between said horizontal section and said vertical section for relatively positioning said vertical section about said pivot support means, a vertical trailer coupling means having a first member connected to the forward end of the trailer unit and a second member connected to the bottom end of said vertical section, a horizontal coupling means having a first member connected to said vertical section and a second member connected to said trailer unit and establishing a pivotal horizontal connection, and said horizontal and vertical sections being constructed and arranged with a releasable load transmitting means and movable to a release position establishing relative movement therebetween with an essentially constant operative spacing of the tractor pivot means and the coupling means, said horizontal section including laterally spaced side rails and a beam structure, a gooseneck lift unit including a power cylinder unit connected to the beam structure and extending downwardly and forwardly and a lift arm unit having one end connected to the power cylinder unit and including a pair of arms extending forwardly and having the outer arm ends pivotally connected to said side rails, said cylinder unit being operable to pivot said arm unit downwardly to a gooseneck support position beneath said horizontal section, said vertical section includes a pair of vertical support sections aligned one each with each of said side rails and located beneath the trailing end of corresponding side rail, said pivot support means connects said vertical support sections to the corresponding side rail with the pivot axis in the horizontal plane with said tractor pivot means, each of said vertical support sections being an essentially open top box-like member having side walls spaced outwardly of the corresponding side rail and having a trailing rear wall, said rear wall including said load transmitting means in the form of an upper load wall pivotally attached to the rear wall, said load wall being engaged by said horizontal section in the transport position and movable outwardly therefrom to said release position.

6. The apparatus of claim 5 wherein said power means includes in each of said vertical support sections a power cylinder unit pivotally connected to the corresponding side rail and to the lower end of said vertical support section within the trailing portions of the vertical support sections.

7. The apparatus of claim 5 including a manually operable latch means connected to said upper load wall to selectively lock said load wall in said transport position and in said release position.

8. A gooseneck apparatus for releasable connection to a truck tractor and to a trailing lowboy trailer comprising
a horizontal section including laterally spaced side rails interconnected by a first pivot structure including a centrally located depending gooseneck coupling means, said horizontal section including back vertical load wall,
a powered gooseneck lift unit connected to the horizontal section and operable to move outwardly to a gooseneck support position beneath said horizontal section,
a vertical support assembly including a pair of vertical sections aligned one each with each of said side rails and located beneath the trailing end of the corresponding side rail,
pivot means connecting said vertical sections to the corresponding side rail with the pivot axis substantially in the horizontal plane with said gooseneck coupling means, said pivot means including corresponding pivot units for each vertical section,
each of said vertical sections being an essentially open top member having side walls spaced outwardly of the corresponding side rail and having a trailing rear wall, said rear wall including an upper load wall attached to the rear wall, said upper wall being engaged by said horizontal section back vertical load wall in the transport load position,
means mounting said upper load wall and said back load wall for relative movement outwardly of each to a release position,
release means operable to lock said back and upper load walls in said release and said load positions,
each of said vertical sections including a power cylinder unit pivotally connected to the corresponding side rail and to the lower end of said vertical section,
a first coupling means including a projection element and a vertical apertured plate element at each of said vertical sections and having one of said elements attached to a forward vertical wall of the trailer and the second of said elements connected to the vertical section, said apertured plate element having an opening with a vertical length greater than said projection element, and
a second coupling means including a vertical projection element and a horizontal apertured plate element located centrally between said side rails and said trailer, one of said elements of said second coupling means being mounted to said vertical support assembly centrally of said vertical sections and the second of said elements of said second coupling means being mounted to the central forward portion of the trailer, said horizontal aperture plate element having an opening with a horizontal dimension greater than said projection element.

9. The gooseneck apparatus of claim 8 wherein said apertured plate element of said first coupling means is a depending plate secured to the forward portion of the vertical section, said plate having said coupling opening, said projection means of said first coupling means including a horizontally projecting pin connected to the forward end of the trailer whereby said vertical section overlies said trailer unit with said depending plate means abutting said trailer unit.

10. The gooseneck apparatus of claim 9 wherein said second coupling means includes a vertically movable element secured to said vertical section.

11. The gooseneck apparatus of claim 8 wherein said laterally spaced side rails extend for the length of the horizontal section and are interconnected by a first pivot structure including a centrally located depending coupling pin and an intermediate beam structure spaced substantially in accordance with the minimum length of the truck tractor bed,
- said gooseneck lift unit including a power cylinder unit connected to the beam structure and extending downwardly and forwardly and a lift arm unit having one end connected to the power cylinder unit and including a pair of arms extending forwardly to said pivot structure and having the outer arm ends pivotally connected to said side rails, said cylinder unit being operable to pivot said arm unit downwardly to a gooseneck support position beneath said horizontal section,
- each of said open top members having a flat bottom wall and said upper load wall being pivotally attached to the rear wall and pivotal outwardly therefrom to said release position,
- said projection element of said second coupling means being a spring-loaded pin element, and a powered chamber means operable to raise said pin element to the release position,
- said apertured plate of said first coupling means being affixed to the forward end of said vertical sections and depending below said bottom wall.

12. The gooseneck apparatus of claim 11 wherein said pivot means connecting said vertical sections to the corresponding side rail includes a lubricated pivot shaft journaled within a journal bushing in said side rail.

13. The apparatus of claim 11 wherein a horizontal connecting plate connects the lower end of said open top members, said powered chamber means including a pneumatically operated chamber mounted above said plate, a pin bushing secured to said plate and depending downwardly therefrom, said pin being journaled in said bushing, a lever means connecting the upper end of said pin to said chamber, said apertured plate of said second coupling including an inclined ramp portion and a horizontal portion containing said opening, said opening extending perpendicular to said horizontal portion, said inclined ramp portion having an outer end located below the lower most end of said pin and operable to force said pin upwardly in response to relative horizontal movement of the pin over said apertured plate.

14. The apparatus of claim 11 having an over linkage mechanism secured to the inner side walls of each of said vertical sections and to the upper load wall and operable to lock said upper load wall in said release and said load positions.

15. The gooseneck apparatus of claim 8 wherein said horizontal section includes an intermediate beam structure spaced substantially in accordance with the minimum length of the truck tractor bed,
- said gooseneck lift unit includes a power cylinder unit connected to the beam structure and extending downwardly and forwardly and a lift arm unit having one end connected to the power cylinder unit and including a pair of arms extending forwardly to said pivot structure and having the outer arm ends pivotally connected to said side rails, said cylinder unit being operable to pivot said arm unit downwardly to a gooseneck support position beneath said horizontal section,
- each of said vertical sections being an essentially open top box-like member having a flat bottom wall and a forward vertical wall connected to said side walls, said upper load wall on said vertical section being pivotally attached to the rear wall and pivotal outwardly therefrom to said release position,
- said release means including an over-center linkage mechanism secured to the inner side walls of each of said vertical sections and to the upper load wall and operable to lock said upper load wall in said release and said load positions,
- said first coupling means having said apertured plate element connected to said forward vertical wall of the vertical section and depending beneath the bottom wall and said projection element being a pin on the trailer located in alignment with the opening with the bottom wall resting on the trailer, and said projection element of said second coupling means being a vertically movable pin, said apertured plate being attached to said trailer, said pin, and
- a pneumatic air chamber and lever means coupled to said vertical support assembly and to said pin to raise and lower said pin.

* * * * *

UNITED STATES PATENT AND TRADEMARK OFFICE
CERTIFICATE OF CORRECTION

PATENT NO. : 4,390,192
DATED : June 28, 1983
INVENTOR(S) : WILBERT A. WAGNER

It is certified that error appears in the above-identified patent and that said Letters Patent are hereby corrected as shown below:

Abstract, Line 11, Cancel "ling" and substitute therefor ---link---; Col. 2, line 34, Cancel "conveneint" and substitute therefor ---convenient---; Col. 3, line 50, Cancel "lift" and substitute therefor ---lifts---; Col. 5, line 28, Cancel "group" and substitute therefor ---ground---; Col. 5, line 35, Cancel "positons" and substitute therefor ------positions---; Col. 6, line 58, Cancel "end" and substitute therefor ---and---; Col. 7, line 36, cancel "3" and substitute therefor ---5---; Col. 8, line 48, Cancel "the" and substitute therefor ---The---; Col. 3, line 51, cancel "releasing" and substitute -- release -- therefor; Col. 7, line 23, cancel "graters" and substitute -- graders --.

UNITED STATES PATENT AND TRADEMARK OFFICE
CERTIFICATE OF CORRECTION

PATENT NO. : 4,390,192
DATED : June 28, 1983
INVENTOR(S) : Wilbert A. WAGNER

It is certified that error appears in the above-identified patent and that said Letters Patent are hereby corrected as shown below:

Col. 9, line 56, Cancel "abutts" and substitute therefor ---abuts---; Col. 10, line 47, Cancel "abutt" and substitute therefor ---abut---; Col. 11, lines 42-43, Cancel "are supported" second occurrence; Col. 12, line 29, Claim 1, Cancel "releasably" and substitute therefor ---releasable---; Col. 13, line 19, Claim 5, Cancel "releasably" and substitute therefor ---releasable---.

Signed and Sealed this

Seventh Day of May 1985

[SEAL]

*Attest:*

DONALD J. QUIGG

*Attesting Officer*   *Acting Commissioner of Patents and Trademarks*